Feb. 26, 1946. G. B. FARKAS 2,395,730
CONSTANT LOAD-SUPPORTING DEVICE
Filed July 20, 1944 2 Sheets—Sheet 1
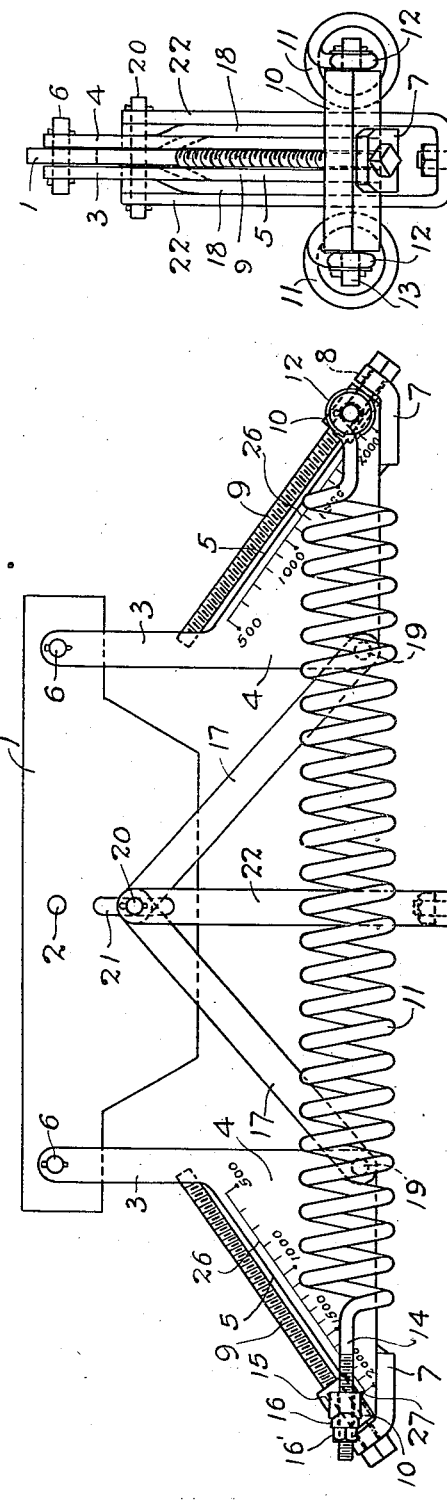
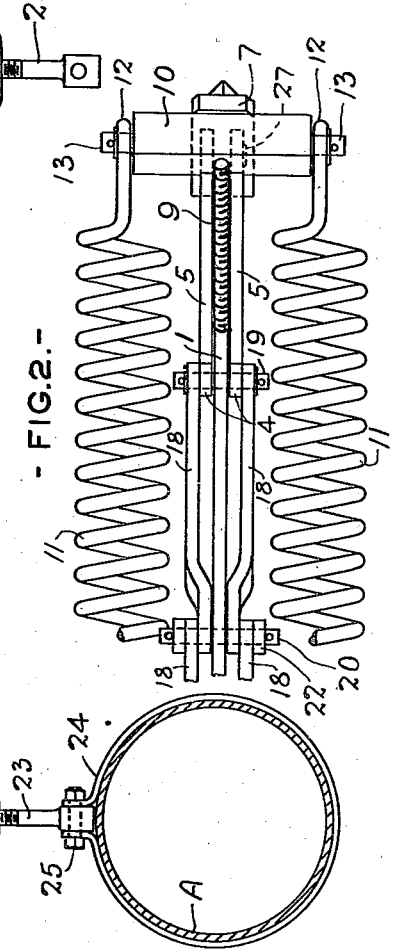
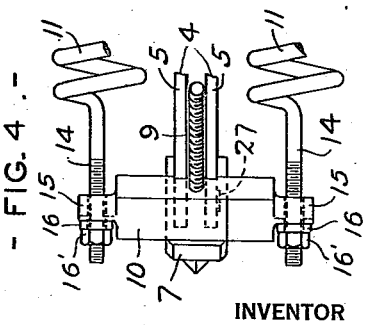
INVENTOR
George B. Farkas
BY
S. C. Yeaton
ATTORNEY

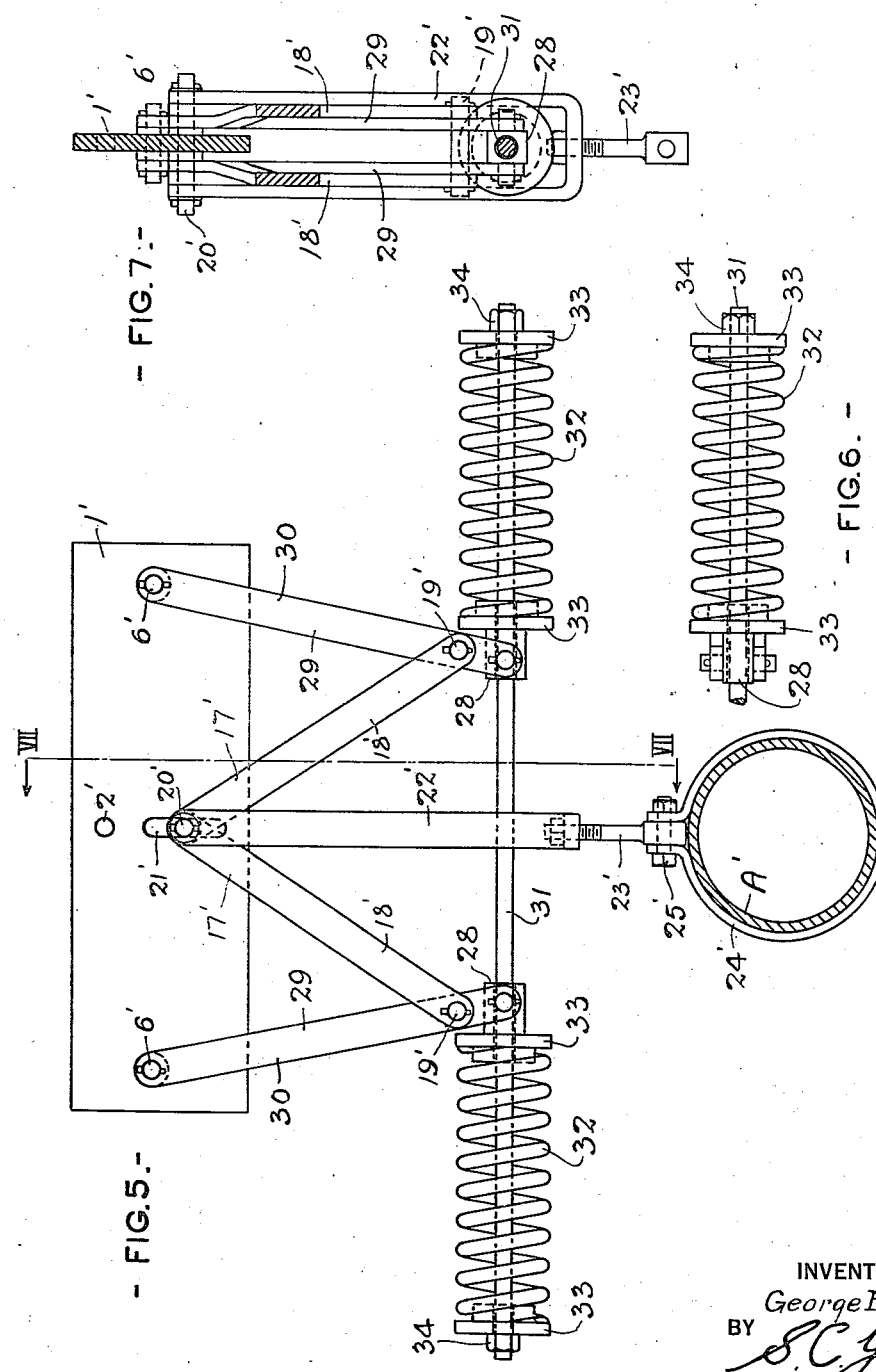

Patented Feb. 26, 1946

2,395,730

UNITED STATES PATENT OFFICE 2,395,730

CONSTANT LOAD-SUPPORTING DEVICE

George B. Farkas, Jackson Heights, N. Y., assignor to American Locomotive Company, New York, N. Y., a corporation of New York Application July 20, 1944, Serial No. 545,829

5 Claims. (Cl. 248—54)

This invention relates to a constant load-supporting device for supporting a load subject to limited vertical movement, and more particularly to a hanger device for supporting a pipe disposed horizontally.

The device of the present invention has particular adaptation to supporting a horizontal length of pipe of a pipe line system, especially a pipe line system subject to temperature changes, including a horizontal pipe and a vertical pipe, the vertical pipe, due to its expansion and contraction, effecting corresponding vertical movements of the horizontal pipe.

An example of such a pipe line system would be a horizontal pipe for conducting live steam running the length of a building and a vertical pipe connected at its top to the horizontal pipe and at its bottom to a boiler.

An object of the invention is to provide a flexible load-supporting device which is not subject to the objectionable vibrations prevalent in conventional rigid supports.

A further object is to provide a load-supporting device having a load-counterbalancing characteristic for all vertical positions of the load under service conditions.

A further object is to provide a load-supporting device having adjustable means maintaining the aforesaid characteristic for loads of different weights to the end that, in the case of a horizontal pipe for example, similar devices by suitable adjustment of said means may be employed for supporting the pipe at various parts thereof differing in weight.

A further object is to provide a constant load-supporting device in which the weight to be supported is transmitted to counterbalancing spring means through a toggle joint.

Other and further objects of the invention will appear from the following description, the accompanying drawings and the appended claims.

Referring to the drawings forming a part of this application, Figure 1 is a front view of a device constructed in accordance with the present invention, a supported pipe being shown in transverse section; Fig. 2 is a plan view of the right end portion of the device of Fig. 1; Fig. 3 is an end view of the device of Fig. 1, viewed from the right, parts being omitted; Fig. 4 is a plan view of the left end portion of the device of Fig. 1; Fig. 5 is a view similar to Fig. 1, showing a modified exemplification of the present invention; Fig. 6 is a plan view of an end portion of the device of Fig. 5; and Fig. 7 is a section on the line VII—VII of Fig. 5, parts being omitted.

Referring to Figs. 1 to 4, the device includes a rigid member 1 which may be supported from beneath, as by posts (not shown), or from above, as from the ceiling of the building in which the device is installed. It may be supported from the ceiling in any desired manner, or a structural part of the building may be used instead of the rigid member. However to render the device complete as a unitary structure, the rigid member 1 will usually be employed, and it may, if desired, be hung from the ceiling by a suitable bar (not shown), an orifice 2 being provided in the member for attaching the bar thereto. The member 1 is somewhat narrower at its end portions than at its intermediate portion.

Two spaced similar arms 3 are provided. Each is formed of two similar parallel spaced three-ended plates 4, each having an inclined face 5. The plates of each arm 3 are disposed one on each side of an end portion of the member 1, and are pivotally connected thereto by a pin 6. The inclined faces are disposed outwardly and each extends from about half way between the upper end and the inner lower end downwardly and outwardly to the outer lower end of its plate. The parallel plates of each arm are secured together in spaced relation at their outer lower ends by a plate 7 which is welded thereto and which is inclined upwardly at its outer end and is provided with a centrally disposed orifice 8 having its axis parallel to the adjacent faces 5. A screw 9 extends upwardly through each orifice 8 parallel to the adjacent faces 5 with its head bearing against the adjacent plate 7 and its opposite end preferably, but not necessarily, disposed and guided between the adjacent plates 4.

A block 10 is threaded at its center on each of the screws 9. Two tension springs 11, one on either side of the member 1, span the blocks 10 and are secured to the ends thereof, which may be by any desired conventional means. In the exemplification of Fig. 1, the ends of the springs are formed and secured to the blocks as shown. While the ends of the spring may be similar they preferably are formed as shown at corresponding ends with eyes 12 secured on trunnions 13 formed on the ends of one of the blocks 10 providing a flexible joint for the springs at these ends thereof, and at their opposite ends with straight threaded portions 14 extending loosely through orifices in lugs 15 formed on the ends of the other block 10. Washers 16 are disposed upon, and nuts 16' are threaded upon, the outer ends of the portions 14, each nut serving as a lock nut and each washer bearing against the adjacent lug 15, the lugs 15 and the washers 16 being shaped concavely and convexly respectively at their engaging faces to provide a flexible connection for the springs at these ends.

The device further includes two upwardly converging links 17, one for each arm 3. Each link is formed of two parallel spaced bars 18. Each arm 3, at its inner lower end, extends into the space at the lower end of its correlated link 17 and is pivotally connected thereat to its link 17 by a pin 19. A spacing washer (not shown) may be provided on each pin 19 between the adjacent plates 4 if desired. The member 1 extends into the space of each link and is pivotally connected to the upper end portions of the links to permit vertical movement of the links at their upper ends. The links form a toggle joint exerting their force on the arms. Means, pivotally connected to the upper end portions of the links, is provided for attachment to the load. In the present exemplification of the invention the links are pivotally connected together by a pin 20 upon which they are secured at the upper end portions of the bars 18. At this pivotal connection each bar 18 of the link at the left (Fig. 1) overlaps the adjacent bar 18 of the link at the right, these bars being adjacent the member 1 and being accordingly offset as shown in Fig. 2 to provide for this. The member 1 is provided with a vertical slot or raceway 21 through which the pin 20 extends, thereby providing a floating pivotal connection for the links allowing vertical movement thereof with the pin 20 in the slot 21. The length of slot 21 limits the permissible vertical movement of the pin 20 and therefore the angle of convergence of the links.

The aforesaid means for attachment to the load in the present embodiment is in the form of a U-shaped hanger member 22 which, at its free ends, is pivotally mounted on the outer ends of pin 20. The load for the device is exemplified as a pipe A. A bolt 23 passes centrally through the yoke of the member 22 and is provided, at its upper end above the yoke, with a supporting nut which may be adjusted as required, and at its lower end with an eye. A strap 24, having eyes at its free ends, supportingly embraces the pipe and is secured to the bolt 23 by a bolt 25 which passes through the eyes of strap 24 and bolt 23.

While the device has been shown in Figs. 1 to 4 of the drawings and described as a device for suspending a load, it will be obvious that with slight changes it can be employed to carry a load other than a suspended load. For instance, if hanger member 22 were rotated 180 degrees and confined to vertical movement, the device would support a load seating on the upper end of the rotated hanger member. Furthermore, while the load has been shown and described as suspended from the hanger member 22, it will be obvious that the device could be rotated 180 degrees, the hanger member 22 hung from the ceiling of a building, and the load (pipe) hung from the member 1.

By adjusting the nuts 16' the desired tension of the springs 11 may be attained which, at proper selection of spring and linkage, will exert a supporting force which for all practical purposes is constant at all intermediate positions of the limited vertical movement of the load, and having once done this it will ordinarily not be necessary to make a readjustment. To set the springs to counterbalance any one of the desired loads for which the device is adapted, all that is then necessary is to turn the screws 9 in proper direction to move the blocks 10 up or down the screws as required to give the springs the tension required to enable the device to carry the load, the tension decreasing as the springs move toward the member 1 at a rate dependent upon the angle of inclination of the faces 5, and by appropriate selection of this incline a, to all practical purposes, constant supporting force is achieved at all positions within the limited vertical movement of the load but varying in intensity as blocks 10 move along faces 5.

During the movement of the blocks their lower faces maintain sliding contact with the faces 5. The lower faces of the blocks are each provided with a central grooved portion that rides upon the adjacent faces 5 preventing end movement of the block. The springs hold the blocks on the faces 5 and the inclination of the faces 5 urges the blocks upwardly thereby holding the heads of screws 9 against plates 7 and maintaining the screws 9 parallel with the adjacent faces 5.

To provide for accurate and equal adjustment at both ends of the springs the outer face of a corresponding plate 4 of each arm 3 is provided with a scale 26 calibrated to indicate pounds ranging in the present instance from 500 pounds at the upper end of the scale to 2000 pounds at the lower end of the scale. The blocks 10 are provided each with a pointer or indicator 27 which moves with the block along the adjacent scale indicating the tension at which the springs are set, that is to say the weight of the load in pounds that the springs will counterbalance at any setting thereof.

The device of Figs. 5 to 7, except for the spring means and the construction of the arms (omitting faces 5) is similar to the device of Figs. 1 to 4 and similar parts are indicated by similar reference numerals with accents added.

The spring means includes two trunnioned sleeves 28 disposed respectively in the spaces between the parallel bars 29 of each arm 30, the trunnions extending through the lower ends of the bars 29. A rod 31, threaded at both ends, extends loosely through the sleeves. Compression springs 32 having washers 33 at each end provided with bosses extending into the springs, are mounted with their washers respectively on each of the outer ends of the rod, the inner washers bearing against their adjacent sleeves and the outer washers bearing against an adjustable nut 34 screwed on each end of the rod.

The operations of the devices are as follows, considering first the device of Figs. 1 to 4. With the blocks 10 adjusted by turning the screws 9 by means of a wrench applied to the heads thereof so that the indicators 27 are both opposite similar points on the scales 26, for instance the 2000 pounds indication, a load of 2000 pounds is secured to the hanger member 22. Assuming that the springs are under insufficient tension to counterbalance 2000 pounds, then the nuts 16' are advanced to increase the tension of the springs until the pin 20, which was at the bottom of its slot, begins to rise. The tension of the springs then is adjusted so that the pin will stay at any point in the slot to which it is moved by manually lifting the load, the load being easily lifted due to the counterbalancing. The load is then removed and the device is ready for use and no further adjustment of the nuts 16' will ordinarily be necessary. This adjustment may be made at the factory.

After this adjustment of the springs by the nuts 16', the pointers 27, at any position of the blocks 10, will indicate on the scales the load the device is intended to carry at that setting of the blocks with the pin 20 floating as aforesaid in the slot 21, it being understood that the blocks 10 should always be moved uniformly to the same setting.

The installation of the device is as follows: Assume the springs have been adjusted by the nuts 16' as aforesaid, that the load has been installed in its place of service and supported thereat by temporary means, and the springs have been moved to a point on the scales where they will not counterbalance the load, the device is then ready to be installed. The strap 24 is attached to the load and the member 1 attached to its support so that the pin 20 will be at or near the bottom of the slot 21. All that is then necessary is to turn the screws 9 so that the counterbalancing effort of the springs will be sufficient to ease the load from the temporary support, that is to say so that the device will take the load. The pin 20 will then have been raised to a point in its slot 21 permitting vertical movement thereof within the permissible range of vertical movement of the load, the pin moving simultaneously with the load. In the case of a horizontal pipe other devices will be used along the pipe and installed in a similar manner to take their respective loads imposed by the pipe.

In the case of the device of Figs. 5 to 7 where the spring means is quite different, there is no provision for the constant load capacity over a wide range of loads; a different spring should be used for each load in order to maintain the constant load feature. One spring could be used only when slight deviation from this constant load feature is tolerable. The device is installed similar to the device of Figs. 1 to 4, and as in that case the springs are preferably, for ease of installation, relieved sufficiently so that they will not counterbalance the load. After the device is installed the nuts 34 are then advanced to counterbalance the load as in the former case.

The operation of each of the devices of Figs. 1 to 4 and of Figs. 5 to 7 when carrying the load, is basically the same, the principle involved being based upon the force which the converging links apply to the springs due to the vertically movable load carried. In either device the angle between the converging links decreases when the load moves up and increases when the load moves down.

Therefore the force applied to the springs when the load moves up decreases, the links being then moving toward a perpendicular position, correspondingly decreasing the component force exerted by the links upon the springs. Contrarywise, the force applied to the springs when the load moves down increases, the links being then moving away from a perpendicular position, correspondingly increasing the component force exerted by the links upon the springs.

When the load moves up there is a corresponding shortening of the tension springs 11 and lengthening of the compression springs 32, with a corresponding loss in the force of the springs in each case. Contrarywise, when the load moves down there is a corresponding lengthening of the tension springs and shortening of the compression springs, with a corresponding increase in the force of the springs in each case. In the case of the device of Figs. 5 to 7 the lengthening and shortening of the compression springs is permitted by corresponding inward and outward movements of the sleeves 28 on the rod 31, which are under the force of the links.

According to the foregoing, with the loss in force of the springs there is a corresponding balancing loss in force upon the springs by the links. Contrarywise, with an increase in force of the springs there is a corresponding balancing increase in force upon the springs by the links.

Therefore with change in force by the springs there is a corresponding change in force upon the springs by the links compensating to maintain a spring counterbalance for all vertical movements of the load under service conditions, the pin 20 or 20', as the case may be, moving vertically corresponding to the vertical movement of the load and maintaining its floating position in its slot.

The load supported by the device is constant for all practical purposes and the device floatingly supports its full weight at all vertical positions of the load. While in the devices of Figs. 1 and 5 reference has been made respectively to tension and compression springs, it is obvious that spring means could be employed substituting for these springs spring means involving respectively compression springs and tension springs.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A device for supporting a load having limited vertical movement comprising two relatively movable members; two spaced arms pivotally connected at corresponding end portions thereof to one of said members and extending therefrom at one side thereof; two links between said arms pivotally connected at corresponding end portions thereof to said arms at their other end portions and converging from their said corresponding end portions toward said one of said members and being pivotally connected at their other end portions to the other of said members, said members being adapted for attachment one to said load for movement therewith and the other to a support for supporting said device; adjustable means for one of said arms including an inclined screw rotatably connected to its correlated arm, and a block on said screw for movement thereby axially thereof relative to said correlated arm; and spring means connected at one of its ends to said block and at the other of its ends with the other of said arms to exert a force for yieldingly resisting outward movement by said load of said arms and links at their said end portions connected together to counterbalance said load throughout its said vertical movement, said block being adjustable by said screw for changing the counterbalance force of said spring means to adapt it for different loads.

2. A device for supporting a load having limited vertical movement comprising two relatively movable members; two spaced arms pivotally connected at corresponding end portions thereof to one of said members and extending therefrom at one side thereof; two links between said arms pivotally connected at corresponding end portions thereof to said arms at their other end portions and converging from their said corresponding end portions toward said one of said members and being pivotally connected at their other end portions to the other of said members, said members being adapted for attachment one to said load for movement therewith and the other to a support for supporting said device; adjustable means for each of said arms including a screw rotatably connected to its correlated arm, and a block on said screw for movement thereby axially thereof relative to said correlated arm, said screws converging toward each other; and spring means connected at its ends to said blocks to exert a force for yieldingly resisting outward movement by said load of said arms and links at their said end portions connected together to counterbalance said load throughout its said vertical movement, said blocks being adjustable by said screws for changing the counterbalance force of said spring means to adapt it for different loads.

3. A device for supporting a load having limited vertical movement comprising two relatively movable members; two spaced arms pivotally connected at corresponding end portions thereof to one of said members and extending therefrom at one side thereof, one of said arms having an inclined outer face and a scale along said outer face; two links between said arms pivotally connected at corresponding end portions thereof to said arms at their other end portions and converging from their said corresponding end portions toward said one of said members and being pivotally connected at their other end portions to the other of said members, said members being adapted for attachment one to said load for movement therewith and the other to a support for supporting said device; adjustable means for said one of said arms including a screw rotatably connected to said one of said arms, and a block on said screw for movement thereby axially thereof relative to said scale, said block engaging said outer face; and spring means connected at one of its ends to said block and at the other of its ends with the other of said arms to exert a force for yieldingly resisting outward movement by said load of said arms and links at their said end portions connected together to counterbalance said load throughout its said vertical movement, said block having an indicator for cooperation with said scale to facilitate adjustment of said block in accordance with said scale for changing the counterbalance force of said spring means to adapt it for different loads.

4. A device as defined in claim 3 wherein one of the spring means connections is adjustable for preadjusting the power of said spring means so that any load within the range of the scale may be counterbalanced by said spring means by movement of the block to a position on said scale corresponding to said load.

5. A device for supporting a vertically movable load comprising a pair of spaced arms adapted to be connected to a support, said arms having converging outer faces; a block adjacent each of said faces; means for moving each of said blocks along said face adjacent thereto; a toggle joint connecting said arms and adapted to be connected to said load in a manner so that the weight of said load tends to swing said arms apart; spring means connected to said blocks and tending to swing said arms together; and means for adjusting the power of said spring means to counterbalance the force of a given load at a given position of said blocks on said faces, said device being adjustable to support other loads by said movement of said blocks along said faces.

GEORGE B. FARKAS.